(12) United States Patent
Andrasko et al.

(10) Patent No.: US 11,530,022 B1
(45) Date of Patent: Dec. 20, 2022

(54) METHOD FOR CONTROLLING HEADING OF A MARINE VESSEL

(71) Applicant: Brunswick Corporation, Mettawa, IL (US)

(72) Inventors: Steven J. Andrasko, Oshkosh, WI (US); Jason S. Arbuckle, Horicon, WI (US); David M. Van Buren, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 366 days.

(21) Appl. No.: 16/031,296

(22) Filed: Jul. 10, 2018

(51) Int. Cl.
*B63H 25/04* (2006.01)
*G05D 1/08* (2006.01)
*G05D 1/02* (2020.01)

(52) U.S. Cl.
CPC .......... *B63H 25/04* (2013.01); *G05D 1/0206* (2013.01); *G05D 1/0875* (2013.01)

(58) Field of Classification Search
CPC .............. G05D 1/0875; G05D 3/1463; B63H 2025/045
See application file for complete search history.

(56) References Cited

U.S. PATENT DOCUMENTS

| 3,187,704 A | 6/1965 | Shatto, Jr. et al. |
| 3,688,252 A | 8/1972 | Thompson |
| 3,715,571 A | 2/1973 | Braddon |
| 3,771,483 A | 11/1973 | Bond |

(Continued)

FOREIGN PATENT DOCUMENTS

| EP | 423901 | 4/1991 |
| EP | 816962 | 7/1998 |

(Continued)

OTHER PUBLICATIONS

Zhang et al., Design and Control of A Hybrid Sailboat for Enhanced Tacking Maneuver, Jul. 4-8, 2018, Proceedings of the 2018 13th World Congress on Intelligent Control and Automation, pp. 377-382 (Year: 2018).*

(Continued)

*Primary Examiner* — Christian Chace
*Assistant Examiner* — Scott R Jagolinzer
(74) *Attorney, Agent, or Firm* — Andrus Intellectual Property Law, LLP

(57) ABSTRACT

A method is disclosed for controlling heading of a marine vessel having a steerable component coupled thereto, the steerable component being rotatable to affect a direction of movement of the vessel. The method is carried out by a control module and includes accepting a command to initiate a control mode in which the vessel's heading is to be maintained at a desired heading. The method includes receiving a current heading of the vessel and determining a heading error between the current heading and the desired heading. The method also includes determining if the vessel is on-plane or off-plane. In response to the vessel being off-plane, the method includes controlling the steerable component to rotate by at least a predetermined correction amount away from a starting position in a direction that will cause the vessel to rotate to reduce the heading error, and subsequently to rotate back toward the starting position.

15 Claims, 7 Drawing Sheets

(56) References Cited

U.S. PATENT DOCUMENTS

| | | | |
|---|---|---|---|
| 4,253,149 A | 2/1981 | Cunningham et al. | |
| 4,318,699 A * | 3/1982 | Wenstadt | B63H 20/10 114/277 |
| 4,428,052 A | 1/1984 | Robinson et al. | |
| 4,513,378 A | 4/1985 | Antkowiak | |
| 4,542,464 A * | 9/1985 | Kramer | G05D 1/0206 114/144 RE |
| 4,769,773 A | 9/1988 | Shatto, Jr. | |
| 4,939,661 A | 7/1990 | Barker et al. | |
| 4,975,709 A | 12/1990 | Koike | |
| 5,172,324 A | 12/1992 | Knight | |
| 5,202,835 A | 4/1993 | Knight | |
| 5,331,558 A * | 7/1994 | Hossfield | G05D 1/0206 114/144 RE |
| 5,362,263 A | 11/1994 | Petty | |
| 5,386,368 A | 1/1995 | Knight | |
| 5,390,125 A | 2/1995 | Sennott et al. | |
| 5,406,488 A * | 4/1995 | Booth | G05B 13/04 244/194 |
| 5,491,636 A | 2/1996 | Robertson et al. | |
| 5,735,718 A | 4/1998 | Ekwall | |
| 5,884,213 A | 3/1999 | Carlson | |
| 6,059,226 A | 5/2000 | Cotton et al. | |
| 6,092,007 A | 7/2000 | Cotton et al. | |
| 6,230,642 B1 | 5/2001 | McKenney et al. | |
| 6,234,853 B1 | 5/2001 | Lanyi et al. | |
| 6,273,771 B1 | 8/2001 | Buckley et al. | |
| 6,377,889 B1 | 4/2002 | Soest | |
| 6,446,003 B1 | 9/2002 | Green et al. | |
| 6,485,341 B1 | 11/2002 | Lanyi et al. | |
| 6,604,479 B2 | 8/2003 | McKenney et al. | |
| 6,611,737 B1 * | 8/2003 | El-Tahan | G05D 1/0206 701/21 |
| 6,678,589 B2 | 1/2004 | Robertson et al. | |
| 6,848,382 B1 | 2/2005 | Bekker | |
| 6,995,527 B2 | 2/2006 | Depasqua | |
| 7,140,315 B2 | 11/2006 | Okuyama | |
| 7,267,068 B2 | 9/2007 | Bradley et al. | |
| 7,268,703 B1 | 9/2007 | Kabel et al. | |
| 7,305,928 B2 | 12/2007 | Bradley et al. | |
| 7,366,593 B2 | 4/2008 | Fujimoto et al. | |
| 7,398,742 B1 | 7/2008 | Gonring | |
| 7,416,458 B2 | 8/2008 | Suemori et al. | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,561,886 B1 | 7/2009 | Gonring et al. | |
| 7,577,526 B2 | 8/2009 | Kim et al. | |
| 7,630,798 B2 | 8/2009 | Mossman et al. | |
| 7,727,036 B1 | 6/2010 | Poorman et al. | |
| 7,743,721 B2 * | 6/2010 | Barrett | B63H 25/04 114/144 R |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 | 3/2012 | Rae et al. | |
| 8,155,811 B2 | 4/2012 | Noffsinger et al. | |
| 8,215,252 B1 | 7/2012 | Chun | |
| 8,265,812 B2 | 9/2012 | Pease | |
| 8,326,472 B2 | 12/2012 | Igarashi et al. | |
| 8,417,399 B2 | 4/2013 | Arbuckle et al. | |
| 8,478,464 B2 | 7/2013 | Arbuckle et al. | |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,777,681 B1 | 7/2014 | McNalley et al. | |
| 8,807,059 B1 | 8/2014 | Samples et al. | |
| 8,831,868 B2 | 9/2014 | Grace et al. | |
| 8,924,054 B1 | 12/2014 | Arbuckle et al. | |
| 9,039,468 B1 | 5/2015 | Arbuckle et al. | |
| 9,110,467 B2 | 8/2015 | Yuet et al. | |
| 9,132,900 B2 | 9/2015 | Salmon et al. | |
| 9,132,903 B1 | 9/2015 | Gable et al. | |
| 9,162,743 B1 | 10/2015 | Grace et al. | |
| 9,248,898 B1 | 2/2016 | Kirchhoff et al. | |
| 9,359,057 B1 | 6/2016 | Arbuckle et al. | |
| 9,377,780 B1 | 6/2016 | Arbuckle et al. | |
| 9,676,464 B2 | 6/2017 | Johnson et al. | |
| 9,690,295 B1 | 6/2017 | Abellera et al. | |
| 9,733,645 B1 | 8/2017 | Andrasko et al. | |
| 9,927,520 B1 | 3/2018 | Ward et al. | |
| 9,952,595 B2 | 4/2018 | Arbuckle et al. | |
| 2003/0191562 A1 | 10/2003 | Robertson et al. | |
| 2004/0221787 A1 | 11/2004 | McKenney et al. | |
| 2005/0170713 A1 | 8/2005 | Okuyama | |
| 2006/0089794 A1 | 4/2006 | Depasqua | |
| 2006/0116796 A1 | 6/2006 | Fossen et al. | |
| 2007/0017426 A1 | 1/2007 | Kaji et al. | |
| 2007/0032923 A1 | 2/2007 | Mossman et al. | |
| 2007/0089660 A1 | 4/2007 | Bradley et al. | |
| 2007/0162207 A1 | 7/2007 | Shimo et al. | |
| 2007/0178779 A1 * | 8/2007 | Takada | B63H 20/12 440/61 S |
| 2007/0203623 A1 | 8/2007 | Saunders et al. | |
| 2007/0233389 A1 | 10/2007 | Stephens | |
| 2009/0037040 A1 | 2/2009 | Salmon et al. | |
| 2009/0171520 A1 | 7/2009 | Kaji | |
| 2009/0276148 A1 | 11/2009 | Ardvisson | |
| 2010/0023192 A1 * | 1/2010 | Rae | B63H 25/04 701/21 |
| 2010/0109944 A1 | 5/2010 | Whitehead et al. | |
| 2011/0153126 A1 | 6/2011 | Arbuckle et al. | |
| 2012/0129410 A1 | 5/2012 | Tyers | |
| 2012/0130570 A1 | 5/2012 | Pease | |
| 2012/0248259 A1 | 10/2012 | Page et al. | |
| 2013/0080044 A1 | 3/2013 | Tyers et al. | |
| 2013/0297104 A1 | 11/2013 | Tyers et al. | |
| 2014/0114509 A1 | 4/2014 | Venables et al. | |
| 2015/0089427 A1 | 3/2015 | Akuzawa | |
| 2015/0277442 A1 | 10/2015 | Ballou | |
| 2015/0346730 A1 | 12/2015 | Stephens et al. | |
| 2016/0016651 A1 | 1/2016 | Anderson et al. | |
| 2016/0101838 A1 | 4/2016 | Kojima | |
| 2016/0125739 A1 | 5/2016 | Stewart et al. | |
| 2016/0246300 A1 | 8/2016 | Langford-Wood | |
| 2016/0252907 A1 | 9/2016 | Parkinson | |
| 2016/0288893 A1 * | 10/2016 | Rydberg | B63B 39/14 |
| 2016/0334792 A1 * | 11/2016 | Jopling | B63H 20/007 |
| 2017/0139426 A1 * | 5/2017 | Ito | G05D 1/0875 |
| 2017/0205828 A1 | 7/2017 | Estabrook | |
| 2017/0205829 A1 | 7/2017 | Tyers | |
| 2017/0210449 A1 | 7/2017 | Frisbie et al. | |
| 2017/0253314 A1 | 9/2017 | Ward | |
| 2017/0255200 A1 | 9/2017 | Arbuckle et al. | |
| 2017/0255201 A1 | 9/2017 | Arbuckle et al. | |
| 2017/0277189 A1 * | 9/2017 | Johnson | B63H 25/06 |
| 2017/0349257 A1 | 12/2017 | Hara et al. | |
| 2017/0365175 A1 | 12/2017 | Harnett | |
| 2018/0015994 A1 | 1/2018 | Kishimoto et al. | |
| 2019/0084662 A1 * | 3/2019 | Wong | B63H 25/04 |
| 2020/0062365 A1 * | 2/2020 | Anderson | H04L 67/04 |

FOREIGN PATENT DOCUMENTS

| | | |
|---|---|---|
| EP | 2161542 | 3/2010 |
| GB | 1173442 | 12/1969 |
| JP | 58061097 | 4/1983 |
| JP | 05-203638 | 8/1993 |
| JP | 7223591 | 8/1995 |
| JP | 2926533 | 7/1997 |
| JP | 11-129978 | 5/1999 |
| JP | 2002173091 | 6/2002 |
| JP | 2003276677 | 10/2003 |
| JP | 200442884 | 2/2004 |
| JP | 2004355105 | 12/2004 |
| JP | 200546034 | 2/2005 |
| JP | 2006137309 | 6/2006 |

(56) References Cited

FOREIGN PATENT DOCUMENTS

| JP | 2009-227035 | 10/2009 |
|---|---|---|
| JP | 2009-241738 | 10/2009 |
| JP | 2009-538782 | 11/2009 |
| JP | 2011128943 | 6/2011 |
| JP | 5042906 | 7/2012 |
| JP | 2012528417 | 11/2012 |
| JP | 5226355 | 7/2013 |
| JP | 2014065495 | 4/2014 |
| WO | WO 9205505 | 4/1992 |
| WO | WO 2006058400 | 6/2006 |
| WO | WO 2016104031 | 6/2016 |

OTHER PUBLICATIONS

CPT Autopilot, The CPT Operation Manual, 2015 (Year: 2015).*
Hendricks, Controlling Low-Speed Wander, Feb. 23, 2012, Boating Magazine (Year: 2012).*
Li, Design of missile rudder control system based on digital PWM, Aug. 27, 2012, IEEE (Year: 2012).*
SkipperTips, Use the Magic of Feathering for Emergency Docking, Oct. 14, 2014, https://www.skippertips.com/public/2440print.cfm (Year: 2014).*
Poorman et al., "Multilayer Control System and Method for Controlling Movement of a Marine Vessel," Unpublished U.S. Appl. No. 11/965,583, filed Dec. 27, 2007.
Gonring, "System and Method for Controlling Course of a Marine Vessel," Unpublished U.S. Appl. No. 15/415,095, filed Jan. 25, 2017.
Arbuckle et al., "Station Keeping Methods," Unpublished U.S. Appl. No. 15/425,184, filed Feb. 6, 2017.
Arbuckle et al., "Vessel Maneuvering Methods and Systems," Unpublished U.S. Appl. No. 15/437,233, filed Feb. 20, 2017.
Arbuckle et al., "Station Keeping Methods," Unpublished U.S. Appl. No. 15/445,031, filed Feb. 28, 2017.
Arbuckle et al., "Station Keeping Methods," Unpublished U.S. Appl. No. 15/887,372, filed Feb. 2, 2018.
Mercury Marine, Joystick Piloting for Outboards Operation Manual, 2013, pp. 24-26.
Mercury Marine, Axius Generation 2 Installation Manual, 2012, pp. 15-25.
Mercury Marine, Zeus 3000 Series Pod Drive Models Operation Manual, 2013, pp. 49-61.

* cited by examiner

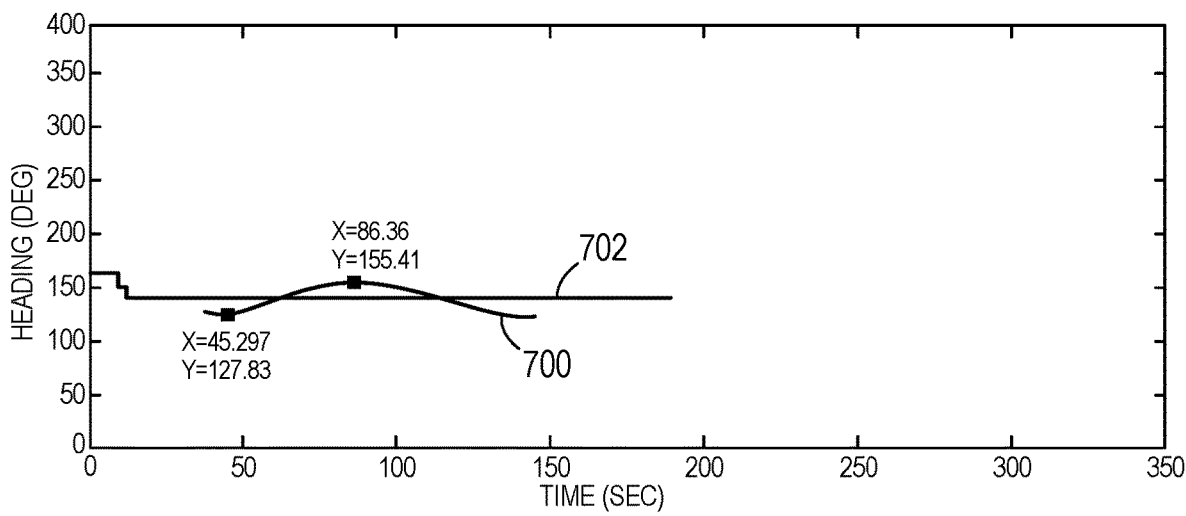
FIG. 7 *(PRIOR ART)*
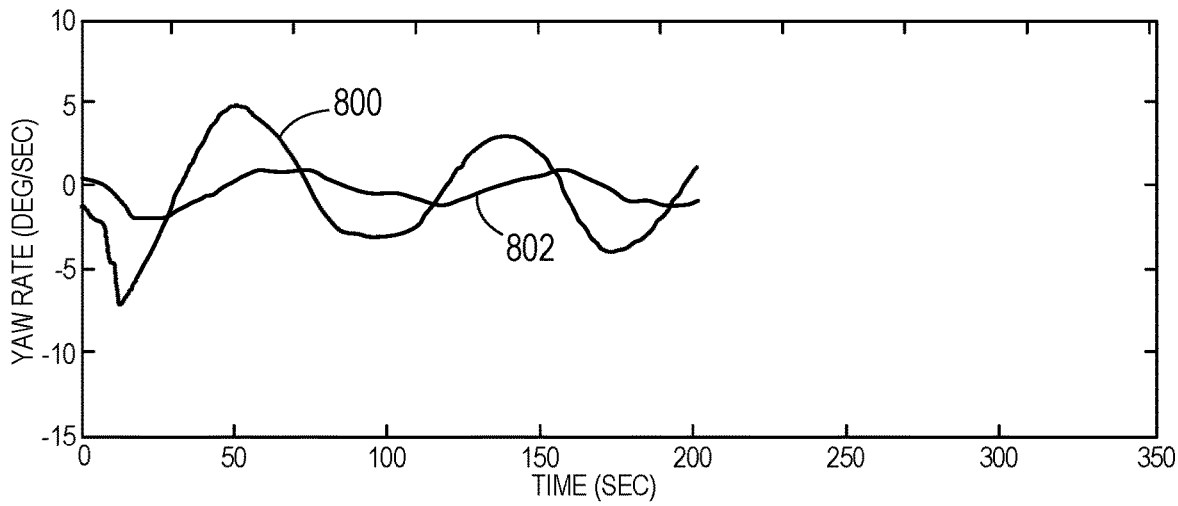
FIG. 8 *(PRIOR ART)*
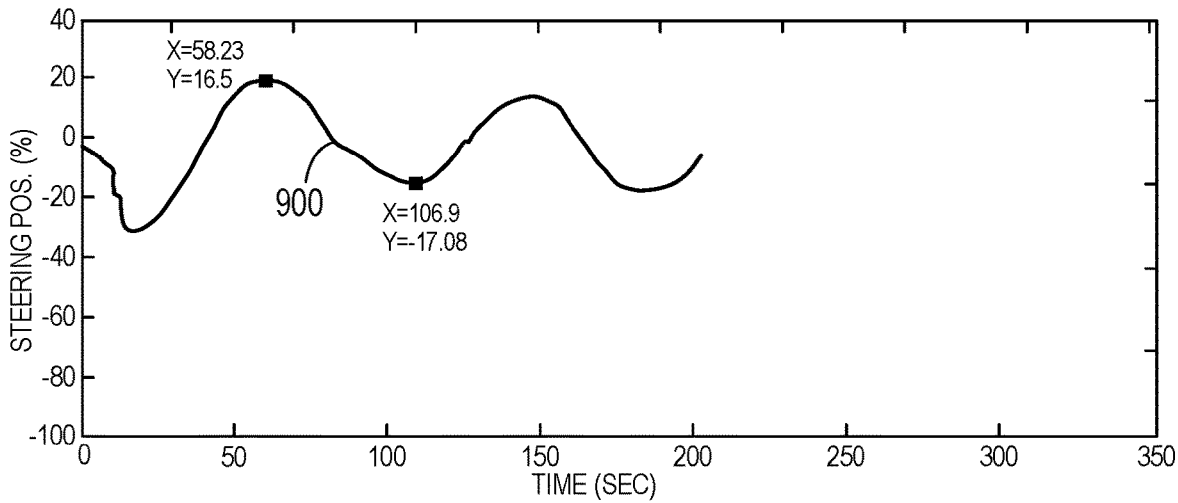
FIG. 9 *(PRIOR ART)*

METHOD FOR CONTROLLING HEADING OF A MARINE VESSEL

FIELD

The present disclosure relates to automatic positioning systems and methods for marine vessels, such as those related to auto-heading.

BACKGROUND

U.S. Pat. No. 6,273,771, which is hereby incorporated by reference herein, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928, which is hereby incorporated by reference herein, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 7,727,036, which is hereby incorporated by reference herein, discloses a system and method for controlling movement of a marine vessel. An operator controllable device outputs a signal that is representative of an operator-desired rate of position change of the vessel about or along an axis. A sensor outputs a signal that is representative of a sensed actual rate of position change of the vessel about or along the axis. A rate of position change controller outputs a rate of position change command based upon the difference between the desired rate of position change and the sensed rate of position change. A vessel coordination controller controls movement of the vessel based upon the rate of position change command.

U.S. Pat. No. 9,377,780, which is hereby incorporated by reference herein, discloses a method for determining a heading value of a marine vessel including determining a first estimate of a direction of the marine vessel based on information from a first source and determining a second estimate of a direction of the marine vessel based on information from a second source. The method includes inputting the first estimate and the second estimate to a control circuit, which scales each of the first estimate and the second estimate and adds the scaled estimates together so as to determine the heading value. A system for determining a heading value of a marine vessel is also disclosed.

U.S. Pat. No. 9,690,295, which is hereby incorporated by reference herein, discloses a propulsion and steering control system for a marine vessel having a joystick device operable to provide control commands, the joystick device having a handle extending on an axis. The control system also has a control unit that receives control commands from the joystick device and correspondingly controls at least one marine drive. The joystick device and the control unit operate in a Heading mode such that the control unit controls the marine drive to automatically maintain the selected heading of the marine vessel. Rotation of the handle about the axis adjusts the selected heading by a predefined increment.

U.S. Pat. No. 9,733,645, which is hereby incorporated by reference herein, discloses a system and method for controlling handling of a marine vessel having a steerable component that is steerable to a plurality of positions to vary a direction of movement of the vessel. A controller is communicatively connected to an actuator of the steerable component and a user input device provides to the controller an operator-initiated steering command to steer the steerable component to one of the plurality of positions. A sensor provides to the controller an indication of an undesired course change of the marine vessel. The controller has a vessel direction control section that outputs a command to the actuator to change a position of the steerable component from the one of the plurality of positions so as to automatically counteract the undesired course change. The vessel direction control section is active only when the operator-initiated steering command is less than or equal to a predetermined threshold.

U.S. Pat. No. 10,640,190, which is hereby incorporated by reference herein, discloses a method for controlling a course of a marine vessel powered by a marine engine as it moves in a body of water. The method includes determining a current global position and a current heading of the vessel and initiating an auto-waypoint mode of a vessel course control system. In response to initiation of the auto-waypoint mode, the method includes setting a course for the vessel based on a current position of a steering wheel of the system and the vessel's current global position. The method thereafter includes automatically rotating a steerable component coupled to the vessel and rotatable to affect a direction of movement of the vessel so as to counteract external forces on the vessel and thereby to maintain the vessel's set course.

Other patents describing various autopilot-related features and related system and method improvements include: U.S. Pat. Nos. 7,267,068; 8,777,681; 9,039,468; 9,248,898; and 9,377,780. Each of these patents is hereby incorporated by reference herein.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to a first example of the present disclosure, method for controlling heading of a marine vessel having a steerable component coupled thereto is disclosed. The steerable component is rotatable to affect a direction of movement of the vessel. The method is carried out by a control module and includes: (a) accepting a command to initiate a control mode in which the vessel's heading is to be maintained at a desired heading; (b) receiving a current heading of the vessel; (c) determining a heading error between the current heading and the desired heading; (d) controlling the steerable component to rotate by at least a predetermined correction amount away from a starting position in a direction that will cause the vessel to rotate to reduce the heading error, and subsequently to rotate back toward the starting position; and (e) repeating steps (b), (c), and (d) until a magnitude of the heading error is less than a predetermined heading error threshold.

According to another example, a method is disclosed for controlling heading of a marine vessel having a steerable component coupled thereto, the steerable component being rotatable to affect a direction of movement of the vessel. The method is carried out by a control module and includes accepting a command to initiate a control mode in which the vessel's heading is to be maintained at a desired heading. The method includes receiving a current heading of the vessel and determining a heading error between the current heading and the desired heading. The method also includes determining if the vessel is on-plane or off-plane. In response to the vessel being off-plane, the method includes controlling the steerable component to rotate by at least a predetermined correction amount away from a starting position in a direction that will cause the vessel to rotate to reduce the heading error, and subsequently to rotate back toward the starting position.

BRIEF DESCRIPTION OF THE DRAWINGS

The present disclosure is described with reference to the following Figures. The same numbers are used throughout the Figures to reference like features and like components.

FIGS. 7-9 illustrate vessel test data captured when a method according to the prior art is carried out.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

Figure 1:
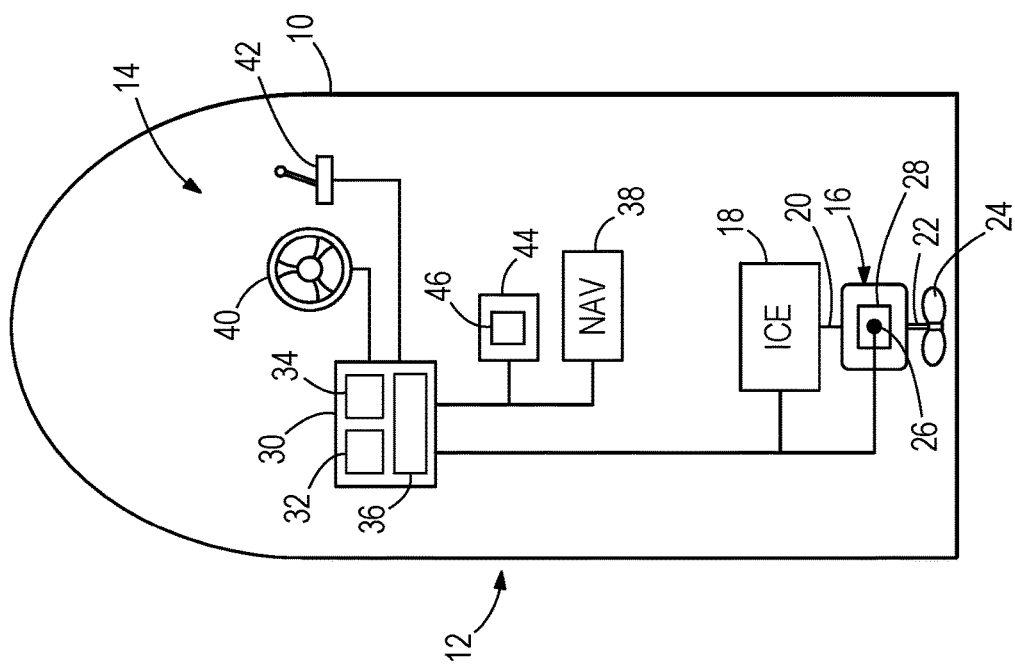
FIG. 1 illustrates a schematic view of a marine vessel according to the present disclosure.
Figures 3, 4:
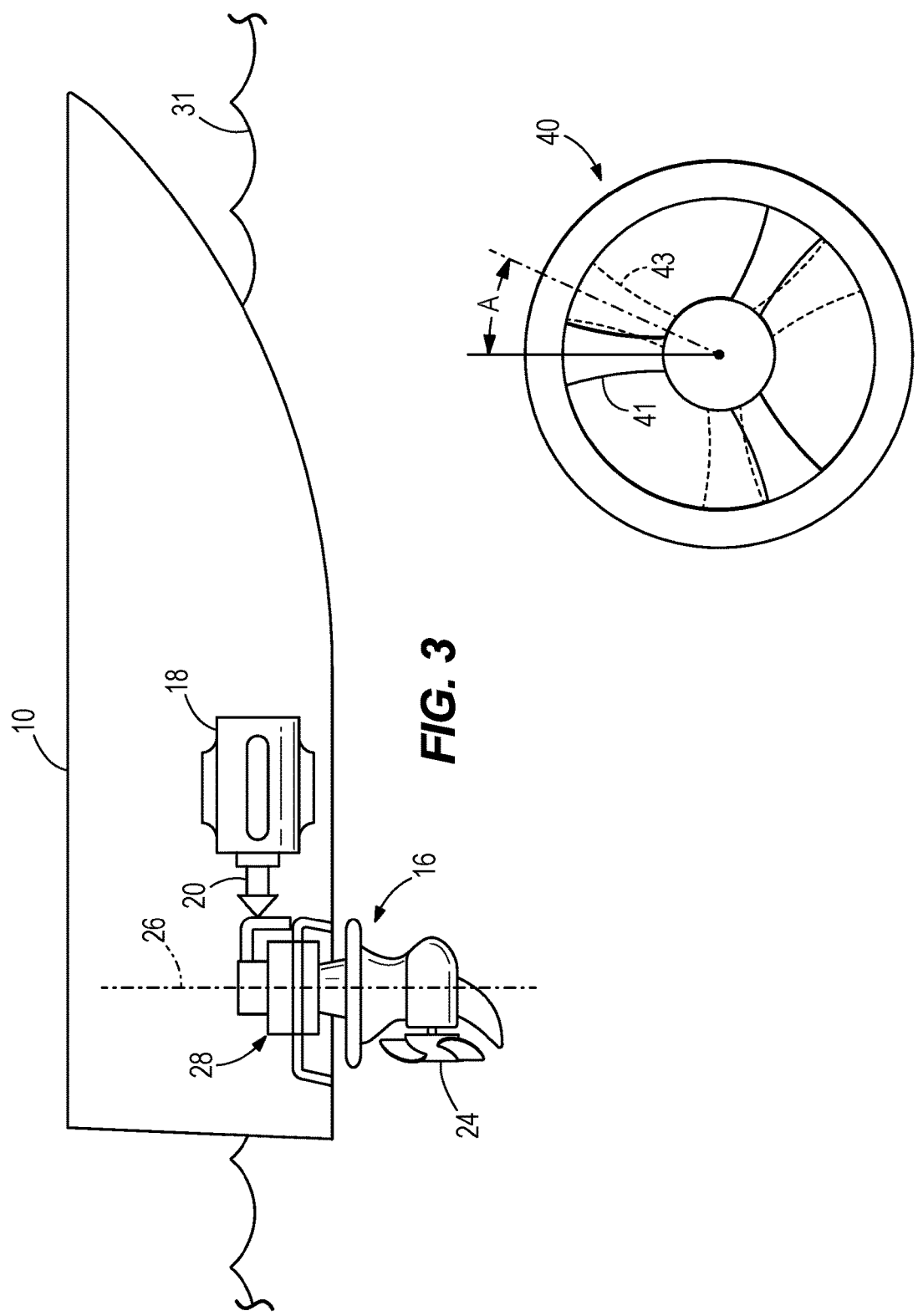
FIG. 3 illustrates a schematic cross-sectional side view of a marine vessel according to the present disclosure.
FIG. 4 illustrates an exemplary user input device for providing an operator-initiated steering command to the steerable component(s) of the marine vessel.

FIG. 1 illustrates a marine vessel 10 with a steerable component 16 located proximate a stern of the vessel 10. Referring also to FIG. 3, in the example shown, the steerable component 16 is a pod drive; however, the steerable component 16 could comprise any of an outboard motor, a stern drive, or a jet drive. Alternatively, if the vessel 10 were provided with an inboard drive, the steerable component 16 could be a rudder. The steerable component 16 is coupled in torque transmitting relationship with an internal combustion engine 18 via an output shaft 20. The steerable component 16 includes a propeller shaft 22 that connects to a propeller 24. When torque is transmitted from the internal combustion engine 18 via the output shaft 20 to the propeller shaft 22 and the propeller 24, a thrust is produced to propel the vessel 10 in a direction that corresponds to a steering position of the steerable component 16. In the example of FIGS. 1 and 3, the steerable component 16 is steerable around a vertical steering axis 26, it being understood that different types of marine vessels and steerable components may have steering axes that are not vertically aligned. The steering axis 26 runs through a steering actuator 28, which actuates the steerable component 16 to one of a plurality of positions so as to control direction of movement of the vessel 10. The steering actuator 28 may be a hydraulic piston-cylinder combination, a rack and pinion device, or any other steering actuator for a steerable marine device known to those having ordinary skill in the art. In the example shown, the steering system is a steer-by-wire system, in which no mechanical linkages are provided between the helm and the steering actuator 28. Rather, the steering actuator 28 moves the steerable component 16 to desired steering angles in response to the output signals from a control module 30.

The internal combustion engine 18 and the steering actuator 28 are communicatively connected to the control module 30, and together make up a portion of a control system 14 for controlling a heading of the vessel 10 as it moves in a body of water 31 (FIG. 3). Returning to FIG. 1, the control module 30 is programmable and includes a processing system (e.g., processor 32) and a storage system (e.g., memory 34). The control module 30 can be located anywhere on the vessel 10 and/or located remote from the vessel 10 and can communicate with various components of the vessel 10 via a peripheral interface and wired and/or wireless links, as will be explained further herein below. Although FIG. 1 shows one control module 30, the vessel 10 can include more than one control module. Portions of the method disclosed herein below can be carried out by a single control module or by several separate control modules. For example, the system 14 can have a control module located at or near a helm of the vessel 10 and can also have control module(s) located at or near the steerable component 16. If more than one control module is provided, each can control operation of a specific device or sub-system on the vessel 10.

In some examples, the control module 30 may include a computing system that includes a processing system, storage system, software, and input/output (I/O) interface 36 for communicating with peripheral devices. The systems may be implemented in hardware and/or software that carries out a programmed set of instructions. For example, the processing system loads and executes software from the storage system, such as software programmed with a method for steering a vessel, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 30 communicates with one or more components on the vessel 10 via the I/O interface 36 and a communication link, which can be a wired or wireless link, and is shown schematically herein by lines connecting the control module 30 to various components. The control module 30 is capable of monitoring and controlling one or more operational characteristics of the system 14 and its various subsystems by sending and receiving control signals via the communication link. In one example, the communication link is a controller area network (CAN) bus, but other types of links could be used. Note that the connections shown herein are not the only way the communications link can be configured.

A navigation system 38 that determines a current global position and a current heading of the vessel 10 is also connected to the control module 30. The navigation system 38 may include a global positioning system (GPS) receiver, a heading sensor, and a yaw rate sensor which may be provided as separate units or combined into one unit known as an attitude and heading reference system (AHRS) that provides 3D orientation of the vessel 10 by integrating gyroscopic measurements, accelerometer data, and magnometer data. In alternative embodiments, a gyroscope, motion reference unit (MRU), inertial measurement unit (IMU), electronic compass, differential GPS, or any combination of the above-mentioned devices could additionally or alternatively be included in the navigation system 38. The navigation system 38 may also provide the vessel speed to the control module 30, such as by noting how far the vessel 10 has traveled in a given period of time. Alternatively, pitot tube or paddle wheel speed sensors may be provided.

The control module 30 is also communicatively connected to user input devices, which include, but are not limited to, a steering wheel 40, a joystick 42, and a mode selection device 44. It should be understood that either the steering wheel 40 or the joystick 42 could be eliminated, and the other of the devices 42, 40 used as the sole user input device for initiating steering commands to steer the steerable component 16. Options that are selectable via the mode selection device 44 will be described further herein below. Note that the mode selection device 44 could be a keypad, keyboard, or gauge, a touch screen or video screen with selectable icons or a scrollable menu, or a smart device such as a phone or tablet running an application that communicates with the system 14. The mode selection device 44 can be fixed to the helm or can be a remote control-type device.

Figure 2:
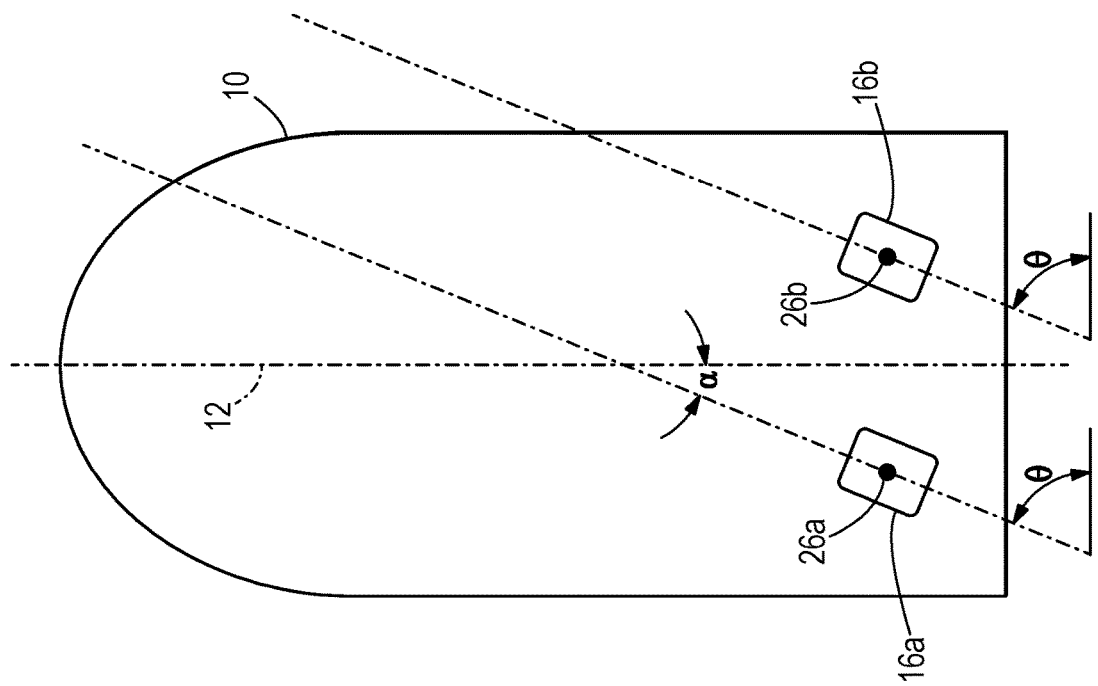
FIG. 2 illustrates a schematic view of a marine vessel having two steerable components, and the steering angles of the steerable components.

Now referring to FIG. 2, the capability of the steerable component 16 to be steered to a plurality of positions will be described. FIG. 2 illustrates two steerable components 16a, 16b. Both of the steerable components could comprise pod drives, or could comprise any of the other steerable components mentioned herein above. It should be understood that the principles discussed herein with reference to the two steerable components 16a, 16b are equally applicable to the single steerable component 16 of FIG. 1, unless noted otherwise. The principles discussed herein also apply when more than two steerable components are provided on the vessel 10, and the number of steerable components is not limiting on the scope of the present disclosure. As shown in FIG. 2, both of the steerable components 16a, 16b are steered around their steering axes 26a, 26b to a steering angle of θ, where θ is related to a virtual center line 12 of the vessel 10 according to the equation $\theta = 90 - \alpha$, where α is an angle of a thrust vector produced by a propeller associated with each steerable component 16a, 16b with respect to the virtual center line 12.

Referring now also to FIG. 4, the steering wheel 40 is rotatable to a plurality of positions (see solid line and dashed line positions), and the steerable components 16, 16a, 16b is/are rotatable to affect a direction of movement of the vessel 10 in response to rotation of the steering wheel 40 in a manual steering mode. For example, a certain degree of actuation of the steering wheel 40 will correspond to a particular steering angle θ of the steerable components 16, 16a, 16b, according to a drive angle map stored in the memory of the control module 30. If the steering wheel 40 is turned clockwise from a neutral, centered position shown in solid lines at 41 by an angle A (or percentage of total allowable wheel angle) to the position shown in dashed lines at 43, this angle or percentage A maps to a particular steering angle θ of the steerable components 16, 16a, 16b. For ease of explanation, the steerable components 16a, 16b are assumed to be turned to the same steering angle θ mapped from the position of the steering wheel 40, although it should be understood that in some embodiments, the steerable components 16a, 16b are instead steered to independently-calculated steering angles that are meant to achieve a particular movement of the vessel 10. Although a steering wheel 40 is shown in FIG. 4 for exemplary purposes, movement of the joystick 42 around its axis could also be mapped to a particular steering angle θ of the steerable components 16, 16a, 16b. Note that hereon forward, the steerable components 16, 16a, 16b will be referred to as the steerable component 16 for purposes of brevity, it being understood that this reference could include one, two, or more steerable components.

In addition to the manual steering mode described above, the vessel 10 can also be controlled in an auto-heading mode, as disclosed in U.S. Patent No. 9,377,780, which was incorporated by reference above. The auto-heading mode may be engaged after an operator has driven the vessel 10 into open water and the vessel 10 is underway. In the auto-heading mode, the operator of the marine vessel may choose to automatically maintain propulsion of the vessel 10 at a predetermined heading with respect to North. To initiate auto-heading, for example, the operator of the vessel 10 could select a numerical heading from a keypad or a touch screen and select the auto-heading feature, for example via the same keypad or touchscreen or via the mode selection device 44. Alternatively, the operator could manipulate the steering wheel 40 or joystick 42 until the vessel 10 is oriented to a desired heading, and then select the auto-heading feature via the mode selection device 44. For example, the mode selection device 44 may include an auto-heading button 46 (FIG. 1) for purposes of initiating the auto-heading mode. The control module 30 would then maintain the vessel 10 at the commanded heading for an extended period of time with little or no operator input required. For example, if wind, waves, or the like push the vessel 10 off this heading, the control module 30 would determine the corrective action needed to return the vessel 10 to the commanded heading, and provide steering and thrust commands to the vessel's propulsion units so as to correct the direction of the vessel 10 such that it thereafter continues at the commanded heading.

In known auto-heading modes, the control module 30 uses a heading feedback signal (indicating an estimate of the heading at which the vessel 10 is actually being propelled) from the navigation system 38 to determine whether correction needs to be made to the actual heading of the vessel 10 in order to maintain the commanded heading. The control module 30 uses the heading feedback signal to determine how and to what extent the steerable component 16 must be steered (and/or what thrust must be provided by the propulsion system) in order to re-orient the vessel 10 to the commanded heading. For example, if the operator has engaged auto-heading and has selected a predetermined heading of 350 degrees, but external forces have caused the vessel 10 to orient itself to a heading of 345 degrees, the control module 30 will use a heading feedback signal of 345 degrees to perform calculations to determine to what extent the steerable component 16 must be steered (and/or what thrust must be provided) in order to re-orient the marine vessel to a heading of 350 degrees. Such automatic correction of the heading of the marine vessel can be achieved according to the principles described in U.S. Pat. No. 7,267,068; U.S. Pat. No. 7,305,928; and/or U.S. Pat. No. 9,039,468, the disclosures of which are hereby incorporated by reference in their entirety. Generally, such auto-heading algorithms use proportional, integral, derivative (PID) or PI-, PD-, or P-control to minimize an error between the commanded heading and the actual heading determined from the heading feedback signal.

However, during research and development, the present inventors noticed that vessel handling characteristics are significantly different at non-planing speeds versus when the vessel is on-plane. Responses to steering inputs, such as those made by the control module 30 while operating in the auto-heading mode, are especially impacted by such differential vessel handling characteristics. For example, a vessel tends to wander at slow speeds due to a combination of effects, such as vortex shedding off of the near-vertical transom. Additionally, a response of the vessel's yaw rate to a given steering input is not easily predicted at slow speeds due to the slow rate of water passing the skeg and gearcase (or rudder). These issues create a challenge for an operator of the marine vessel who is trying to maneuver through a no-wake zone, and traditional PID feedback control requires continuous steering corrections to maintain the commanded heading. For example, the vessel may follow an S-shaped trajectory through the water as the PID feedback control attempts to correct for unintended yaw in the port or starboard direction.

Additionally, many vessel manufacturers now desire to enable autopilot features on much larger vessels, such as houseboats. Such desire requires a new method for controlling heading and yaw rate at slow vessel speeds, as larger vessels will be even less responsive to steering inputs at slower speeds, thereby requiring large momentary inputs to initiate a change in heading.

FIGS. 7-9 illustrate vessel test data captured when an auto-heading method according to known methods was carried out. Specifically, the method for correcting heading error used in FIGS. 7-9 was a cascading PID control method, which first controlled to a desired heading and output a target yaw rate, and then controlled an angle of the steerable component to achieve that target yaw rate. FIG. 7 shows how the current (actual) heading 700 of the vessel oscillates around the desired heading 702 with peak-to-peak amplitude of approximately 28°. FIG. 8 shows the target yaw rate 800 output by the PID controller, while FIG. 9 shows the steering position 900 of the steerable component, which oscillates in an attempt to achieve the target yaw rate 800. Note that there is about a 34% difference peak-to-peak in the movement of the steerable component. Returning to FIG. 8, this oscillation in steering position results in an actual yaw rate 802 that merely chases the target yaw rate 800, and as shown in FIG. 7, an actual heading 700 that oscillates about the desired heading 702.

The present inventors have therefore developed methods for controlling marine vessel heading by adding separate control logic that is active only when the vessel is at non-planing speeds. Such methods can take into account the very large phase delay between movement of the steerable component and actual vessel yaw feedback. Specifically, the present methods use impulse steering inputs (e.g., steps to non-zero values followed by returns to nominal) that result in changes in heading much more quickly than known methods of ramping up the steering correction according to PID control and waiting for a heading change to occur.

Figure 5:
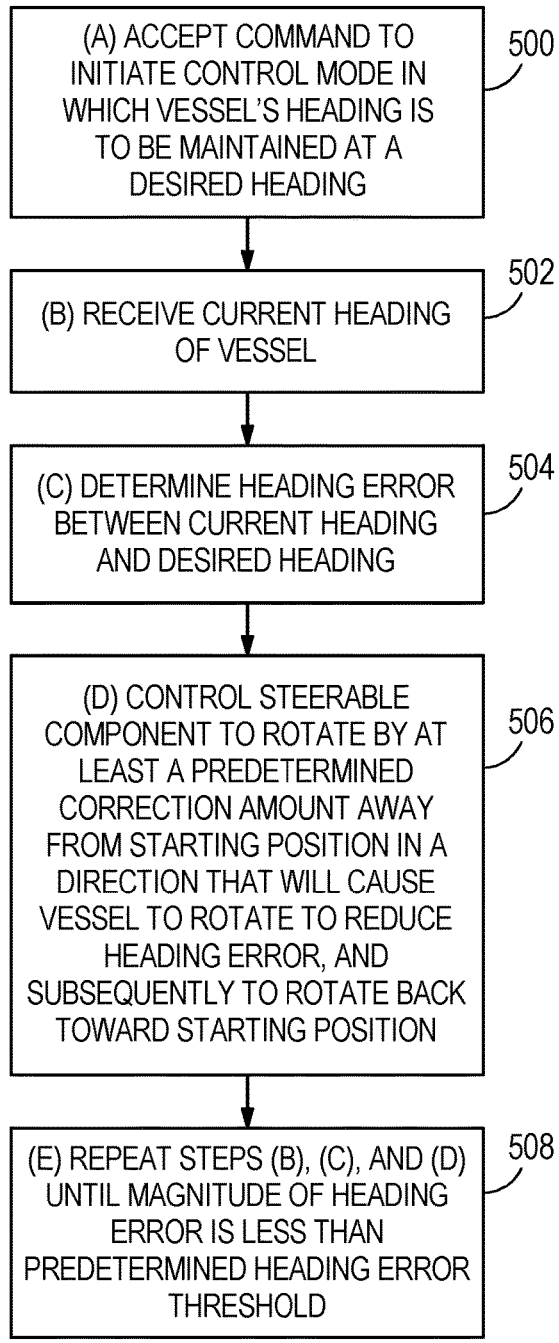
FIG. 5 illustrates one example of a method according to the present disclosure.

FIG. 5 illustrates one example of a method for controlling heading of a marine vessel 10 having a steerable component 16 coupled thereto. As noted above, the steerable component 16 is rotatable to effect a direction of movement of the vessel 10. The method is carried out by a control module 30 and includes the following steps:

(A) accepting a command to initiate a control mode in which the vessel's heading is to be maintained at a desired heading, as shown at 500. Such a command to initiate the auto-heading mode can be input in any of the manners noted herein above.

(B) receiving a current heading of the vessel 10, as shown at 502. The current heading of the vessel 10 can be determined by any of the above-noted devices in the navigation system 38, which are in signal communication with the control module 30 and provide the vessel's current heading thereto.

(C) determining a heading error between the current heading and the desired heading, as shown at 504.

(D) controlling the steerable component 16 to rotate by at least a predetermined correction amount away from a starting position in a direction that will cause the vessel 10 to rotate to reduce the heading error, and subsequently to rotate back toward the starting position, as shown at 506, and as will be described further herein below.

(E) repeating steps B, C, and D until a magnitude of the heading error is less than a predetermined heading error threshold.

Figure 6:
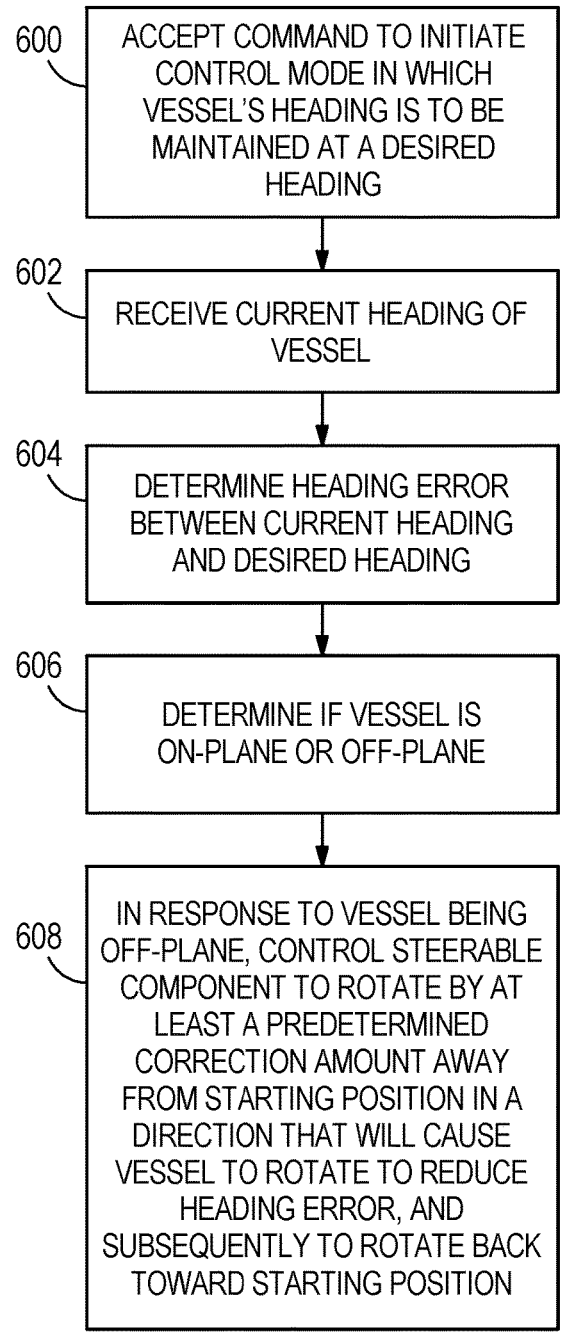
FIG. 6 illustrates another example of a method according to the present disclosure.

Another method for controlling heading of a marine vessel 10 having a steerable component 16 coupled thereto is disclosed in FIG. 6. The steerable component 16 is rotatable to effect a direction of movement of the vessel 10, as described herein above. The method is carried out by a control module 30 and includes accepting a command to initiate a control mode in which the vessel's heading is to be maintained at a desired heading, as shown at 600. Such auto-heading mode can be initiated in any of the manners noted herein above. The method also includes receiving a current heading of the vessel 10 as shown at 602. Again, the current heading can be measured by any of the above-noted devices, from which the control module 30 may obtain the current heading. The method may also include determining a heading error between the current heading and the desired heading, as shown at 604. As shown at 606, the method includes determining if the vessel 10 is on-plane or off-plane. To do so, the control module 30 may compare the vessel speed, as determined from any of the above-noted speed sensors or sensors capable of providing information to calculate a vessel speed, to a threshold planing speed. If the vessel's current speed is above the planing speed, the vessel 10 is presumed to be on-plane, while if the vessel speed is below the threshold planing speed, the vessel 10 is assumed to be off-plane. In other examples, sensors such as inclinometers, accelerometers, etc. may be used to determine if the vessel 10 is on-plane or off plane, such as by determining an angle of the vessel 10 with respect to the body of water 31. Alternatively, both the vessel speed and its angle of inclination in the water can be used to determine if the vessel 10 is on-plane or off-plane. As shown at 608, in response to the vessel 10 being off-plane, the method includes controlling the steerable component 16 to rotate by at least a predetermined correction amount away from a starting position in a direction that will cause the vessel 10 to rotate to reduce the heading error, and subsequently to rotate back toward the staring position. Again, this portion of the method will be described further herein below.

Figure 10:
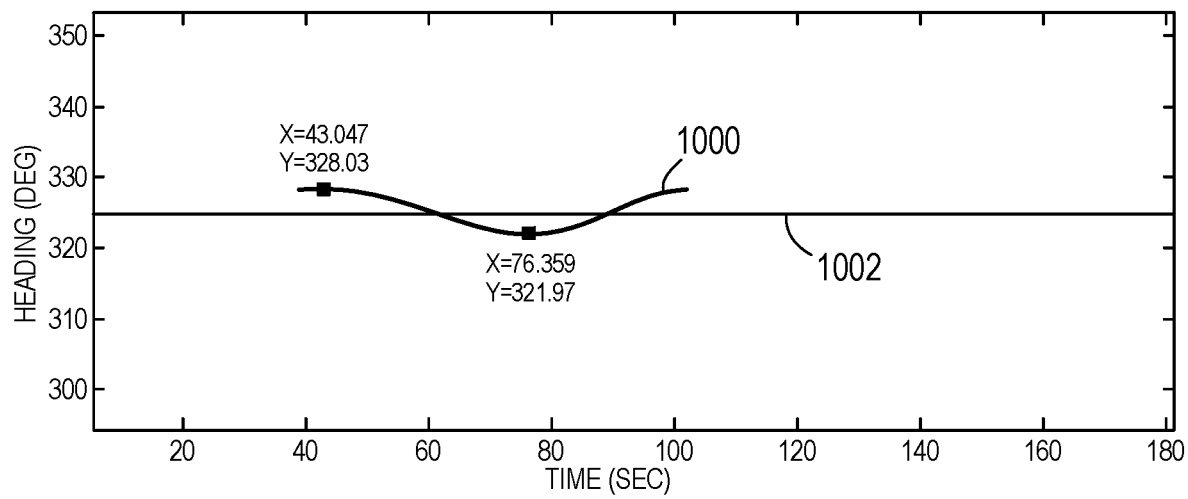
FIGS. 10-12 illustrate vessel test data captured when a method according to the present disclosure is carried out.
Figure 11:
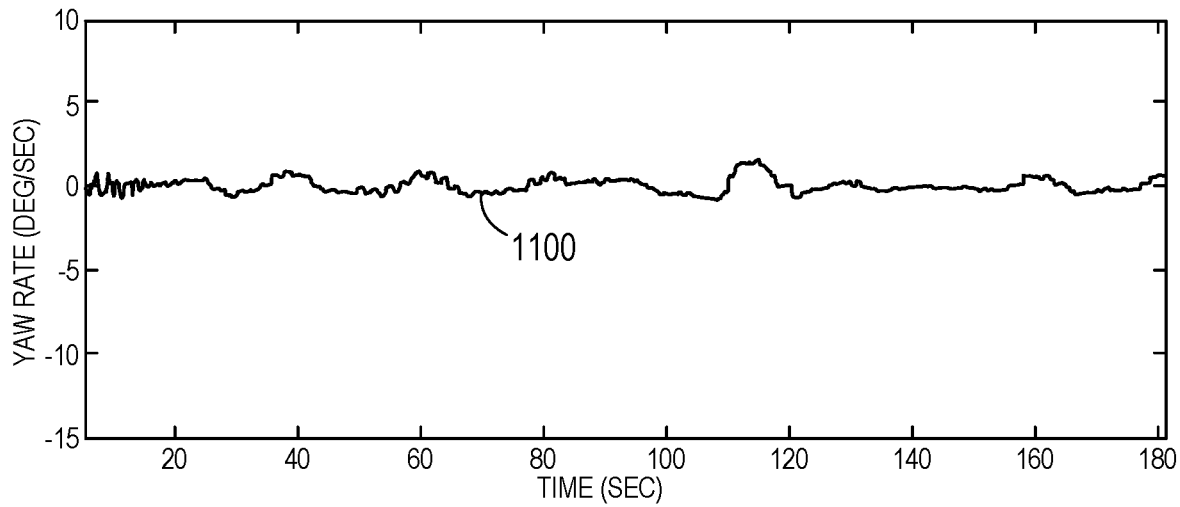
Figure 12:
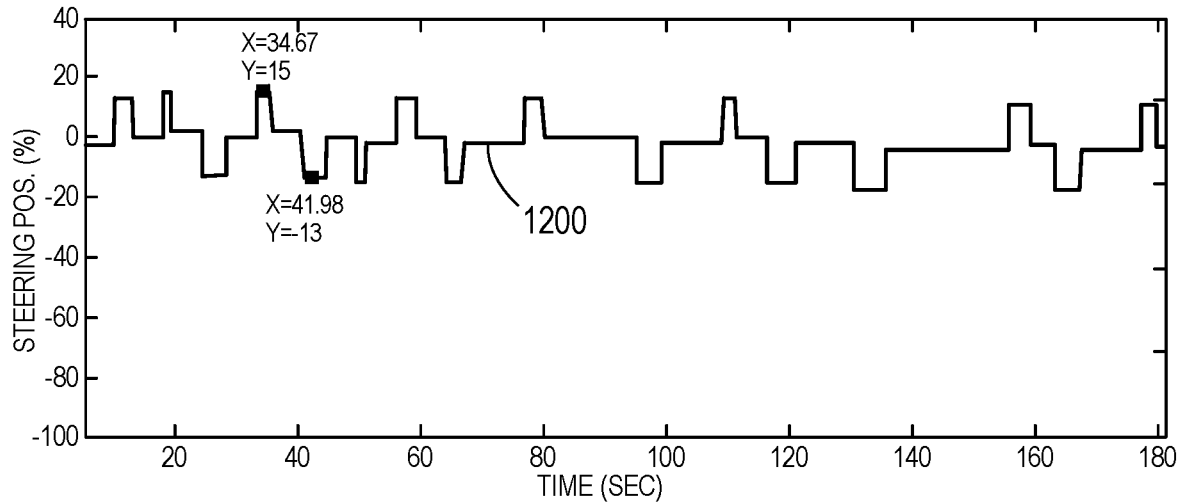

FIGS. 10-12 illustrate vessel test data captured when a method according to the present disclosure, such as the method of FIG. 5 or FIG. 6, is carried out. As shown in FIG. 10, the current heading 1000 still oscillates around the desired heading 1002, but with a much smaller peak-to-peak amplitude of only about 7°. (Compare the 28° peak-to-peak oscillation of the current heading shown in FIG. 7.) FIG. 12 shows the steering position 1200 of the steerable component 16, which instead of following a somewhat sinusoidal path shown at 900 in FIG. 9, changes periodically according to impulse steering inputs that momentarily increase or decrease the steering position before rotating the steerable component 16 back toward its starting position. As shown in FIG. 11, this results in a yaw rate that only moves a small amount around 0, as shown at 1100. In other words, the vessel 10 maintains a current heading 1000 that is much closer to the desired heading 1002 without much rotation required (i.e., a near-zero yaw rate).

Figure 13A:
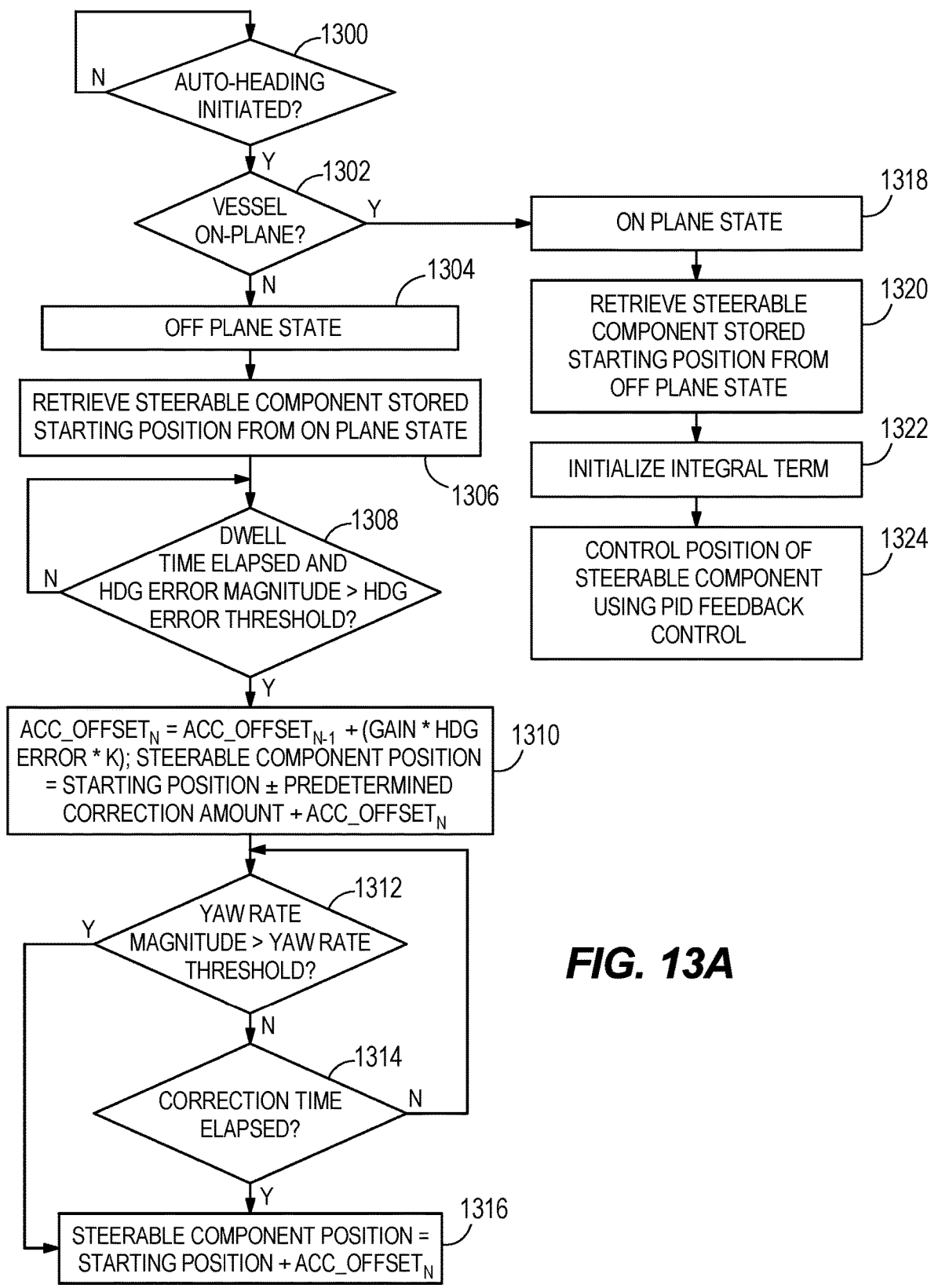
FIGS. 13A and 13B illustrate a logic diagram for a control module that carries out an exemplary method according the present disclosure.
Figure 13B:
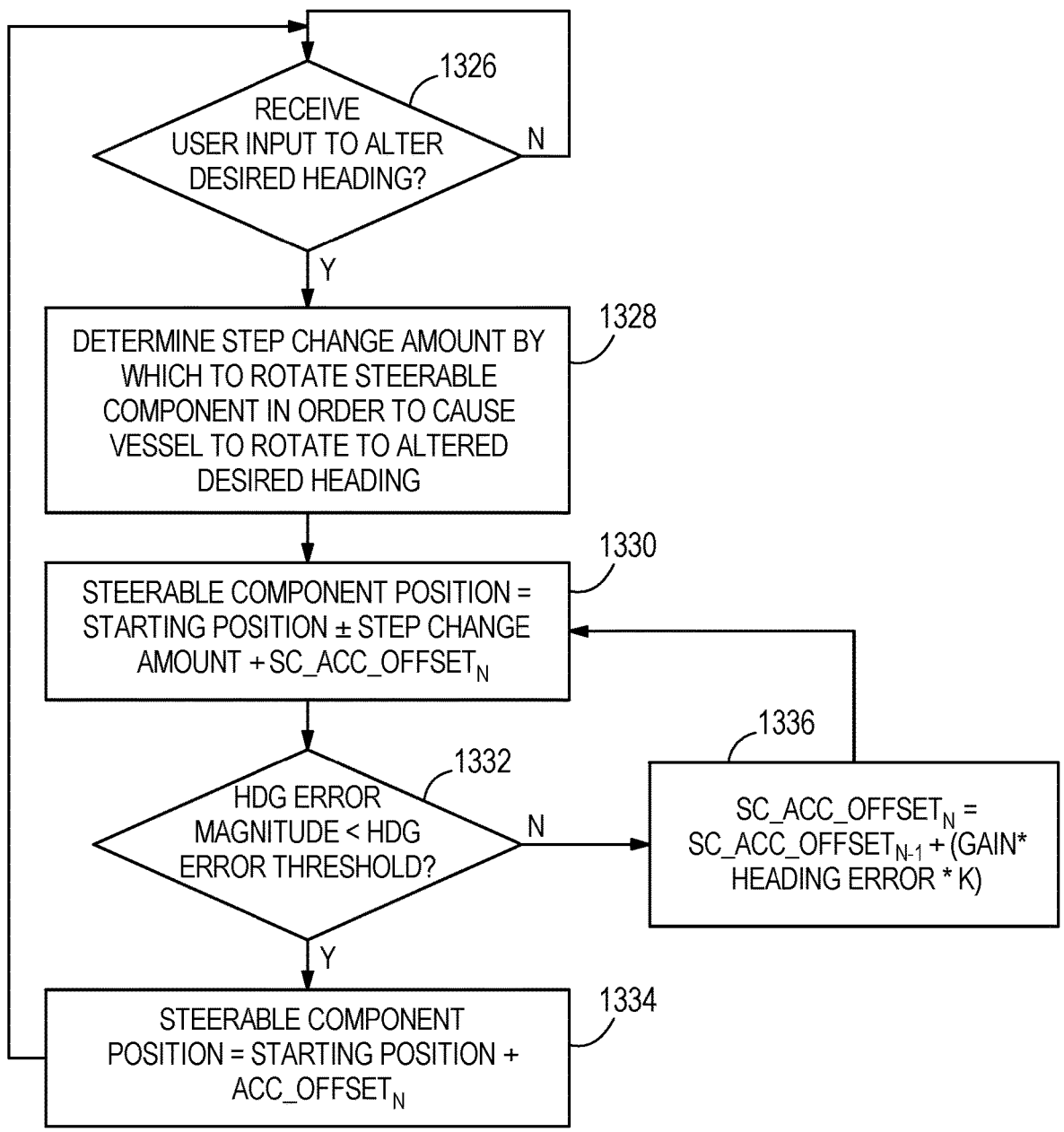

FIGS. 13A and 13B illustrate exemplary logic that the control module 30 may use in order to implement the methods described hereinabove with respect to FIGS. 5 and 6. As shown at 1300, the control module 30 may determine if auto-heading has been initiated, such as in any of the manners described hereinabove. If NO, the method does not progress. If YES at 1300, the control module 30 next determines if the vessel 10 is on-plane, as shown at 1302. The control module 30 can determine whether the vessel 10 is on plane according to any of the above-noted methods and/or using any of the above-noted sensors. If YES, the control module 30 flags the system 14 as being in an on-plane state, as shown at 1318. If NO at 1302, the control module 30 flags the system 14 as being in an off-plane state, as shown at 1304.

Next, as shown at 1306, the control module 30 retrieves a starting position of the steerable component 16 from the memory 34. Generally, after the system 14 has been restarted, this stored starting position will be 0%, and the steerable component 16 will be steered straight ahead such that its centerline is aligned with the virtual center line 12 of the vessel 10. However, this value could be non-zero, such as if it is stored after previous operation in the on-plane state, as will be described further herein below.

Next, as shown at 1308, the control module 30 determines if a dwell time has elapsed and if a heading error magnitude is greater than a heading error threshold. The dwell time may be on the order of 5-10 seconds, and the heading error threshold may be on the order of 0-5 degrees. Thus, returning briefly to FIG. 5, the method described therein may further include comparing the magnitude of the heading error to the heading error threshold between steps C (504) and D (506), and performing step D (506) in response to the magnitude of the heading error exceeding the heading error threshold. This portion of the control logic ensures that the system 14 does not attempt to correct for very small heading errors, in order to prevent overshoot and cause a heading error in the opposite direction. If NO at 1308, the control module 30 waits until both the dwell time has elapsed and the heading error magnitude is greater than the heading error threshold before taking further action. In other examples, only one or the other of the conditions needs to be met before the method will continue. If YES at 1308, the method continues to 1310, where the control module 30 determines an accumulated offset amount and sets the steerable component position equal to the starting position (retrieved at 1306) plus or minus a predetermined amount, plus the accumulated offset amount. Thus, the present methods include controlling the steerable component 16 to rotate by the predetermined correction amount plus the accumulated offset amount away from the starting position before controlling the steerable component to rotate back toward the starting position.

The predetermined correction amount is the amount by which the steerable component 16 is to be momentarily rotated in an attempt to correct heading during a single iteration of control. For example, referring to FIG. 12, the predetermined correction amount (i.e., impulse step) for each iteration of control is about 15%. The predetermined correction amount may be a calibrated, constant amount. Alternatively, the predetermined correction amount may be determined from a lookup table or a function based on vessel speed and/or heading error. Thus, the predetermined correction amount may change over time, such as decrease as a function of decreasing heading error. This way, at steady state, the method may be correcting only for heading error caused by water separation from the vessel's transom. The predetermined correction amount is added to or subtracted from the starting position based on whether the steerable component 16 is to be turned to starboard or port in order to correct the marine vessel's heading. Note that the positive or negative convention does not matter, so long as it is consistent. Additionally, although the predetermined correction amount is herein referred to as a percentage of a total allowable steering angle of the steerable component 16 it may instead be expressed in degrees or in other units.

The control module 30 may determine the accumulated offset amount as a function of the heading error. For example, during the current iteration of control, the control module 30 determines the accumulated offset amount according the equation:

$$ACC\_OFFSET_N = ACC\_OFFSET_{N-1} + (GAIN * HDG\ ERROR * K).$$

$ACC\_OFFSET_{N-1}$ is the accumulated offset amount from the previous iteration of control, which may be zero in the event that the system 14 has just been restarted. HDG ERROR is the difference between the current and desired headings, which is calculated beforehand. GAIN may be a constant, calibrated gain value, or may be determined from a lookup table or a function based on vessel speed and/or heading error. K is a time constant, and in one example may be 0.005 seconds, although any constant on the order of this could be used. The accumulated offset amount acts somewhat as an integral term and, because it is based on heading error, can be used to provide slightly more rotation of the steerable component 16 during a given iteration of control in order to effect a slightly greater change in heading than the predetermined correction amount alone would otherwise effect.

As the steerable component 16 rotates according to the impulse command calculated at 1310, the navigation system 38 determines the vessel's yaw rate. As shown at 1312, the control module 30 determines if the magnitude of the yaw rate is greater than a yaw rate threshold. If YES at 1312, the method continues to 1316, and the steerable component position is set to the starting position plus the accumulated offset for that iteration of control. Returning briefly to the method of FIG. 5, that method may therefore also include determining the yaw rate of the vessel 10 while carrying out step D (506), and in response to the magnitude of the yaw rate being greater than the predetermined yaw rate threshold, controlling the steerable component 16 to rotate back to the starting position. The predetermined yaw rate threshold may be a constant, calibrated amount, or may be determined from a lookup table or a function based on vessel speed and/or heading error. In general, the yaw rate threshold has a magnitude that indicates the vessel 10 is now responding to movement of the steerable component 16 in the desired direction required to correct the heading error (i.e., the vessel 10 is rotating).

If NO at 1312, the method continues to 1314, where the control module 30 determines if a predetermined correction time has elapsed. The correction time may be a constant, calibrated value, and may be on the order of 5 seconds. If NO, the method returns to 1312. If YES, the method continues to 1316, where the control module 30 sets the steerable component position equal to the starting position plus the accumulated offset for that iteration of control. Thus, the method further includes maintaining the steerable component 16 at the predetermined correction amount plus the accumulated offset amount from the starting position for a predetermined correction time before controlling the steerable component 16 to rotate back toward the starting position. Note that the logic performed at 1312 and 1314 need not be performed in the order shown, and could in fact be performed simultaneously. In other examples, both the criteria shown at 1312 and 1314 must be met before the steerable component 16 would be rotated back to the starting position plus the accumulated offset.

Thus, although the present methods include rotating the steerable component 16 back toward the starting position, it is not necessary that the steerable component 16 be rotated all the way back to the starting position for a given iteration of control. Because the present methods instead include controlling the steerable component 16 to rotate back to the starting position plus the accumulated offset amount, this represents a departure from known PID control algorithms, where the nominal steering position is zero. The accumulated offset therefore helps account for the fact that the response of the system 14 is not linear when the vessel 10 is operating at slow speeds.

After 1316, the method returns to 1308, where the control module 30 again determines if the dwell time has elapsed and if the heading error magnitude is greater than the heading error threshold. Therefore, returning briefly to the method of FIG. 5, the method also includes waiting for a predetermined dwell time between performing step D (506) and step E (508). The dwell time is provided in order to give the vessel 10 time to react to the steering position step change, as momentum causes the vessel 10 to continue to yaw even after the steerable component 16 is rotated back toward the starting position. The dwell time may be a constant, calibrated amount, or may be determined from a lookup table or a function based on vessel speed and/or heading error. Even if the dwell time has elapsed, according to the present example, there is no need to make another correction unless the present heading error magnitude is greater than the heading error threshold; thus, this criteria must also be met for the method to proceed to 1310 and once again momentarily rotate the steerable component in an attempt to correct the heading.

Note that the accumulated offset amount is therefore also used to alter the starting (nominal) steering position of the steerable component 16 over a period of time. For example, if successive corrections to starboard occur to maintain heading, the starting steering position may increase by a percentage of each periodic correction. For example, if the predetermined correction amount is 5% of total allowable steering angle, each time the correction occurs, 20% of that 5% may be used to offset the starting steering position. During the first iteration of control, rather than returning the steerable component to 0% (straight ahead) position, the steerable component would instead be returned to 1% (i.e., 20% of 5%). If further correction is needed to obtain the desired heading, during the second iteration of control, the steerable component would rotate from 1% to 6% (assuming a constant predetermined amount), and thereafter return to 2%, and so on, until no further corrections were needed.

In other examples, the control module 30 does not calculate an accumulated offset amount. Instead, step 1310 comprises calculating the steerable components' position by merely adding/subtracting the predetermined correction amount to/from the starting position. Once the magnitude of the vessel's yaw rate exceeds the yaw rate threshold (1312) and/or the correction time has elapsed (1314), the control module 30 would add or subtract a predetermined integration step to the starting position of the steerable component for the next iteration of control.

Now returning to 1318, in which the system 14 is in the on-plane state, the control module 30 continues to 1320, and retrieves the steerable component's stored starting position from the off-plane state. When the vessel 10 transitions from off-plane to on-plane running, the accumulated steady state output (i.e., the starting position plus the accumulated offset) will be used to initialize the integral term for the on-plane PID control, as shown at 1322. Thus, the method includes utilizing the predetermined correction amount plus the accumulated offset amount to initialize the integral term of the PID feedback control. This way, the PID control does not start anew, but rather utilizes some of the learning from the earlier, slower speed step control. As shown at 1324, the control module 30 thereafter controls the position of the steerable component 16 using PID feedback control, according to known methods described briefly hereinabove. The final integral term of this PID control may be saved in the memory 34 and then used to initialize the starting position of the steerable component 16 during subsequent operation of the system 14 in the off-plane state. See 1306.

Note that at any time during the routine of 1300-1316, if the vessel 10 speeds up enough to get on-plane, the routine of 1318-1324 can be entered, and heading error will be minimized by way of PID feedback control. Conversely, the method of correcting heading with momentary impulse inputs is used only so long as the vessel 10 is off-plane. For example, referring briefly again to the method of FIG. 5, the method may also include determining if the vessel 10 is on-plane or off-plane before performing step D (506) and performing step D (506) in response to the vessel being off-plane.

FIG. 13B illustrates a portion of the logic carried out by the control module 30 in response to receiving a user input to alter the desired heading, as shown at 1326. If such a user input is received when the vessel 10 is in the on-plane state, PID feedback control is used according to known methods in order to control the vessel's heading to the altered desired heading. FIG. 13B therefore describes the method that is carried out when the vessel 10 is off-plane and moving at slower speeds when the desired heading is changed. If no user input to alter the desired heading has been received (NO at 1326), the control module 30 takes no action. If YES at 1326, the control module 30 continues to 1328, where it determines a step change amount by which to rotate the steerable component 16 in order to cause the vessel 10 to rotate to the altered desired heading. The step change amount may be determined by way of a look-up table or an equation that relates the desired heading change or the new heading error to a required change in position of the steerable component 16. The method then continues with controlling the steerable component 16 to rotate by the step change amount away from the starting position plus the accumulated offset. As noted hereinabove, if this is the first iteration of control, the accumulated offset may be zero. Thus, as shown at 1330, the control module 30 sets the steerable component position to the starting position plus or minus the step change amount plus a step change accumulated offset amount. Again, note that the step change amount may be added or subtracted to the starting position according to any selected convention relating starboard or port movement of the steerable component 16 to a positive or negative direction. The step change accumulated offset amount is different from the accumulated offset calculated at 1310, and represents an integrated amount that is required to help the vessel 10 obtain the altered desired heading, as determined during previous iterations of the method shown in FIG. 13B.

As shown at 1332, the control module 30 then determines if the heading error magnitude is less than the heading error threshold, which may be the same heading error threshold used at 1308. If YES, the control module 30 determines that the steerable component 16 has been rotated enough in order to achieve or nearly achieve the altered desired heading, and the steerable component 16 is returned to the starting position plus the accumulated offset amount, as shown at 1334. The accumulated offset amount here may be the same as the accumulated offset amount calculated at 1310, as it represents an integrated amount needed to correct for steady state conditions tending to cause heading error. The method then returns to 1326 until another user input to alter the desired heading is received.

If NO at 1332, the method continues to 1336, and the control module 30 calculates the step change accumulated offset during the current iteration of control as follows:

$$SC\_ACC\_OFFSET_N = SC\_ACC\_OFFSET_{N-1} + (GAIN * HDG\ ERROR * K)$$

HDG ERROR is calculated as the difference between the current heading and the altered desired heading; GAIN here may be determined from a lookup table or as a function based on heading error; and the constant K is a time constant, which may be the same as the time constant noted with respect to 1310, or may be a different time constant. After 1336, the control module 30 returns to 1330 and the steerable component position is set to the starting position plus or minus the step change amount plus the step change accumulated offset, which was calculated at 1336. Thus, it can be seen that the step change accumulated offset aids the vessel 10 in reaching the altered desired heading, if the step change amount calculated at 1328 was not enough to effect such a change. In other examples, however, there is no step 1336, and step 1330 includes merely adding the step change to the starting position.

Note that at 1326, in the event the control module 30 determines that no user input to alter the desired heading has been received, the system 14 remains in the off-plane state and the method according to 1308-1316 is carried out as described hereinabove.

In other examples, the gains used at 1310 and 1336 could additionally or alternatively be determined as functions of the following: vessel mass, wherein larger gains are used for larger masses; vessel length, where larger gains are used for longer lengths; and/or number of propulsion devices, where smaller gains are used for more propulsion devices. Note also that if at any point the auto-heading mode is cancelled, the above-noted timers, steerable component starting positions, and accumulated offset amounts are reset to zero.

In the above description certain terms have been used for brevity, clarity and understanding. No unnecessary limitations are to be implied therefrom beyond the requirement of the prior art because such terms are used for descriptive purposes only and are intended to be broadly construed. The different systems and methods described herein above may

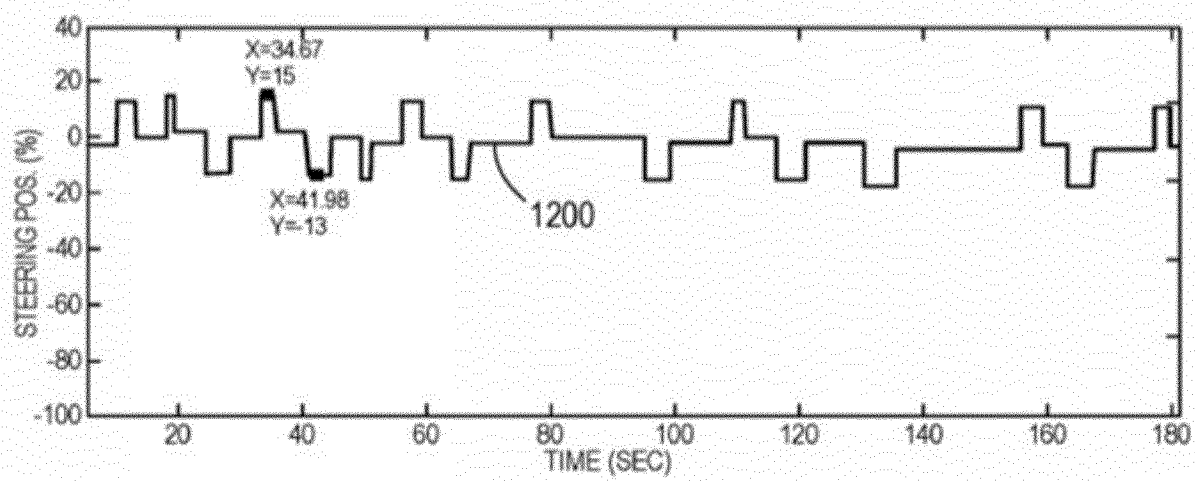

What is claimed is:

1. A method for controlling heading of a marine vessel having a steerable component coupled thereto, the steerable component having a propeller configured to rotate to produce thrust and being rotatable to affect a direction of the thrust and a direction of movement of the vessel caused by the thrust, the method being carried out by a control module and comprising:
    accepting a command to initiate a control mode in which the vessel is to be maintained at a desired heading;
    receiving a current heading of the vessel;
    determining a heading error between the current heading and the desired heading;
    determining if the vessel is on-plane or off-plane; and
    only in response to the vessel being off-plane, controlling the steerable component to rotate by a predetermined correction amount plus an accumulated offset amount away from a starting position in a direction that will cause the vessel to rotate to reduce the heading error, and subsequently to rotate back to the starting position plus the accumulated offset amount despite the heading error having been determined to be non-zero, during a single iteration of control; and
    during a subsequent single iteration of control, controlling the steerable component to rotate from the starting position plus the accumulated offset amount by the predetermined correction amount plus a newly calculated accumulated offset amount in the direction that will cause the marine vessel to rotate to reduce the heading error, and subsequently to rotate back to the starting position plus the newly calculated accumulated offset amount.

2. The method of claim 1, further comprising:
    receiving a user input to alter the desired heading;
    determining a step change amount by which to rotate the steerable component in order to cause the vessel to rotate to the altered desired heading; and
    controlling the steerable component to rotate by the step change amount plus the accumulated offset amount away from the starting position.

3. The method of claim 1, further comprising determining the accumulated offset amount as a function of the heading error.

4. The method of claim 3, wherein the newly calculated accumulated offset amount for a given iteration of control is the accumulated offset amount from a previous iteration of control plus the heading error multiplied by a gain and a time constant.

5. The method of claim 1, further comprising maintaining the steerable component at the predetermined correction amount plus the accumulated offset amount from the starting position for a predetermined correction time before controlling the steerable component to rotate back to the starting position plus the accumulated offset amount.

6. The method of claim 1, further comprising:
    determining a yaw rate of the vessel;
    in response to a magnitude of the yaw rate being greater than a predetermined yaw rate threshold, controlling the steerable component to rotate back to the starting position plus the accumulated offset amount.

7. The method of claim 1, wherein in response to determining that the vessel is on-plane, the method includes minimizing the heading error by controlling a position of the steerable component using proportional, integral, derivative (PID) feedback control.

8. The method of claim 7, further comprising utilizing the predetermined correction amount plus the accumulated offset amount to initialize an integral term of the PID feedback control.

9. The method of claim 1, further comprising repeating the following steps until a magnitude of the heading error is less than a predetermined heading error threshold:
    receiving the current heading of the vessel;
    determining the heading error between the current heading and the desired heading;
    determining if the vessel is on-plane or off-plane; and
    only in response to the vessel being off-plane, controlling the steerable component to rotate by the predetermined correction amount plus the accumulated offset amount away from the starting position in the direction that will cause the vessel to rotate to reduce the heading error, and subsequently to rotate back to the starting position plus the accumulated offset amount, during a single iteration of control.

10. A method for controlling heading of a marine vessel having a steerable component coupled thereto, the steerable component having a propeller configured to rotate to produce thrust and being rotatable about a steering axis to affect a direction of the thrust and a direction of movement of the vessel caused by the thrust, the method being carried out by a control module and comprising:
    accepting a command to initiate a control mode in which the vessel is to be maintained at a desired heading;
    determining if the marine vessel is on-plane or off-plane;
    receiving a current heading of the marine vessel;
    determining a heading error between the current heading and the desired heading;
    in response to determining that the marine vessel is off-plane:
    (1) during a first single iteration of control, controlling the steerable component to rotate by a predetermined correction amount plus an accumulated offset amount away from a starting position in a direction that will cause the marine vessel to rotate to reduce the heading error, and subsequently to rotate back to the starting position plus the accumulated offset amount despite the heading error having been determined to be non-zero;
    (2) receiving the current heading of the marine vessel and redetermining the heading error between the current heading and the desired heading;
    (3) recalculating the accumulated offset amount as the accumulated offset amount from the previous iteration of control plus the heading error from step (2) multiplied by a gain and a time constant; and
    (4) during a subsequent single iteration of control, controlling the steerable component to rotate from the starting position plus the accumulated offset amount from step (1) by the predetermined correction amount plus the accumulated offset amount from step (3) in a direction that will cause the marine vessel to rotate to reduce the heading error, and subsequently controlling the steerable component to rotate back to the starting position plus the accumulated offset amount from step (3);

(5) for as long as the marine vessel remains off-plane, subsequently repeating steps (2) through (4) until a magnitude of the heading error is less than a predetermined heading error threshold; and in response to determining that the marine vessel is on-plane, controlling a position of the steerable component using proportional, integral, derivative (PID) feedback control so as to minimize the heading error.

11. The method of claim 10, further comprising:
receiving a user input to alter the desired heading;
determining a step change amount by which to rotate the steerable component in order to cause the vessel to rotate to the altered desired heading; and
controlling the steerable component to rotate by the step change amount plus the accumulated offset amount away from the starting position during a given iteration of control.

12. The method of claim 10, further comprising maintaining the steerable component at the predetermined correction amount plus the accumulated offset amount from the starting position for a predetermined correction time before controlling the steerable component to rotate back to the starting position plus the accumulated offset amount.

13. The method of claim 10, further comprising:
determining a yaw rate of the marine vessel while carrying out step (1) and step (4); and
in response to a magnitude of the yaw rate being greater than a predetermined yaw rate threshold, controlling the steerable component to rotate back to the starting position plus the accumulated offset amount.

14. The method of claim 10, further comprising:
comparing the magnitude of the heading error to the heading error threshold; and
controlling the steerable component to rotate by the predetermined correction amount plus the accumulated offset amount away from the starting position in the direction that will cause the marine vessel to rotate to reduce the heading error only in response to the magnitude of the heading error exceeding the heading error threshold.

15. The method of claim 10, further comprising waiting for a predetermined dwell time before performing step (5).

\* \* \* \* \*

UNITED STATES PATENT AND TRADEMARK OFFICE
CERTIFICATE OF CORRECTION

PATENT NO. : 11,530,022 B1
APPLICATION NO. : 16/031296
DATED : December 20, 2022
INVENTOR(S) : Andrasko et al.

It is certified that error appears in the above-identified patent and that said Letters Patent is hereby corrected as shown below:

On the Title Page

Please replace the title page with the attached title page showing the corrected number of claims.

In the Claims

Claim 1, Column 15, Line 23, after "off-plane;" delete "and";

Claim 1, Column 15, Line 32, after "control;" delete "and";

Claim 1, Column 15, Line 33, between "control" and the "," insert -- while the vessel remains off-plane --;

Claim 1, Column 15, Line 41, after "amount", insert -- ; and
in response to determining that the vessel is on-plane, controlling a position of the steerable component using proportional, integral, derivative (PID) feedback control so as to minimize the heading error --;

Claim 7, Column 16, Lines 3-7, delete claim 7 in its entirety;

Claim 8, Column 16, Line 8, delete "7" and substitute therefor -- 1 --;

Claim 10, Column 16, Line 33, before "vessel", insert -- marine --;

Claim 10, Column 16, Line 36, before "vessel", insert -- marine --.

Signed and Sealed this
Twelfth Day of March, 2024

Katherine Kelly Vidal
*Director of the United States Patent and Trademark Office*

(12) United States Patent
Andrasko et al.

(10) Patent No.: US 11,530,022 B1
(45) Date of Patent: Dec. 20, 2022

(54) METHOD FOR CONTROLLING HEADING OF A MARINE VESSEL

(71) Applicant: Brunswick Corporation, Mettawa, IL (US)

(72) Inventors: Steven J. Andrasko, Oshkosh, WI (US); Jason S. Arbuckle, Horicon, WI (US); David M. Van Buren, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 366 days.

(21) Appl. No.: 16/031,296

(22) Filed: Jul. 10, 2018

(51) Int. Cl.
 B63H 25/04 (2006.01)
 G05D 1/08 (2006.01)
 G05D 1/02 (2020.01)

(52) U.S. Cl.
 CPC ........... *B63H 25/04* (2013.01); *G05D 1/0206* (2013.01); *G05D 1/0875* (2013.01)

(58) Field of Classification Search
 CPC ............ G05D 1/0875; G05D 3/1463; B63H 2025/045
 See application file for complete search history.

(56) References Cited

U.S. PATENT DOCUMENTS

| | | |
|---|---|---|
| 3,187,704 A | 6/1965 | Shatto, Jr. et al. |
| 3,688,252 A | 8/1972 | Thompson |
| 3,715,571 A | 2/1973 | Braddon |
| 3,771,483 A | 11/1973 | Bond |

(Continued)

FOREIGN PATENT DOCUMENTS

| | | |
|---|---|---|
| EP | 423901 | 4/1991 |
| EP | 816962 | 7/1998 |

(Continued)

OTHER PUBLICATIONS

Zhang et al., Design and Control of A Hybrid Sailboat for Enhanced Tacking Maneuver, Jul. 4-8, 2018, Proceedings of the 2018 13th World Congress on Intelligent Control and Automation, pp. 377-382 (Year: 2018).*

(Continued)

*Primary Examiner* — Christian Chace
*Assistant Examiner* — Scott R Jagolinzer
(74) *Attorney, Agent, or Firm* — Andrus Intellectual Property Law, LLP

(57) ABSTRACT

A method is disclosed for controlling heading of a marine vessel having a steerable component coupled thereto, the steerable component being rotatable to affect a direction of movement of the vessel. The method is carried out by a control module and includes accepting a command to initiate a control mode in which the vessel's heading is to be maintained at a desired heading. The method includes receiving a current heading of the vessel and determining a heading error between the current heading and the desired heading. The method also includes determining if the vessel is on-plane or off-plane. In response to the vessel being off-plane, the method includes controlling the steerable component to rotate by at least a predetermined correction amount away from a starting position in a direction that will cause the vessel to rotate to reduce the heading error, and subsequently to rotate back toward the starting position.

14 Claims, 7 Drawing Sheets